E. A. BEYL.
FRICTION CLUTCH.
APPLICATION FILED MAR. 21, 1919.

1,330,931.

Patented Feb. 17, 1920.

Inventor
Emil A. Beyl
By his Attorneys
Williamson Merchant

UNITED STATES PATENT OFFICE.

EMIL A. BEYL, OF MINNEAPOLIS, MINNESOTA.

FRICTION-CLUTCH.

1,330,931.   Specification of Letters Patent.   Patented Feb. 17, 1920.

Application filed March 21, 1919. Serial No. 284,027.

*To all whom it may concern:*

Be it known that I, EMIL A. BEYL, a citizen of the United States, residing at Minneapolis, in the county of Hennepin and State of Minnesota, have invented certain new and useful Improvements in Friction-Clutches; and I do hereby declare the following to be a full, clear, and exact description of the invention, such as will enable others skilled in the art to which it appertains to make and use the same.

My invention has for its object to provide an extremely simple and highly efficient friction clutch intended for general use; and, to this end, it consists of the novel devices and combinations of devices hereinafter described and defined in the claims.

In the accompanying drawings, which illustrate the invention, like characters indicate like parts throughout the several views.

Referring to the drawings.

Figure 1:
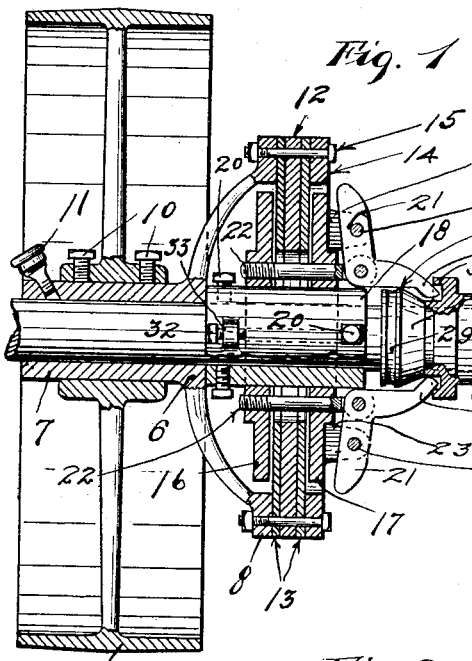
Figure 1 is a view partly in elevation and partly in central section with the clutch arranged to transmit power to a shaft to which said clutch is applied.
Figure 2:
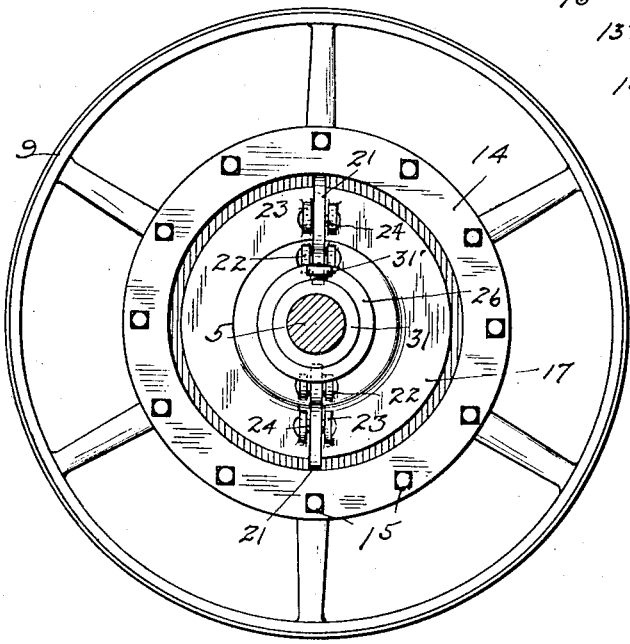
Fig. 2 is a view principally in end elevation with the shaft sectioned on the line 2—2 of Fig. 1.

Referring first to the construction shown in Figs. 1 and 2, the numeral 5 indicates a driven shaft and the numeral 6 indicates a spider having a hub loosely mounted on said shaft. The arms of the spider 6 are curved outward from one end of the hub 7 and have integrally formed with their free ends a clamping ring 8. The hub of a driven pulley 9 is mounted on the spider hub 7 and is rigidly secured thereto by set screws 10, to cause the spider 6 to rotate therewith. A grease cup 11 is mounted on the hub of the pulley 9.

Carried by the spider 6, is a driving member 12 in the form of a wide ring having the same diameter as the spider ring 8, but extending materially inward therefrom. The driving member 12 is axially located in respect to the shaft 5 and with considerable clearance therebetween. On each side of the driving member 12, is a friction face 13, of the same general outlines as said driving member and made of any suitable material. The driving member 12 and its friction faces 13 are clamped between the spider ring 8 and a like ring 14 and rigidly secured to said spider ring, for rotation therewith, by a plurality of nut-equipped bolts 15 inserted through alined bores in said driving member, friction faces and rings.

Coöperating with the driving member 12, is a pair of opposing driven members 16 and 17 arranged for action on the friction faces 13. These driven members 16 and 17 are in the form of disks axially located, respectively, within the rings 8 and 14 and have bossed axial openings affording hubs that are slidably mounted on a bearing sleeve 18 and held for rotation therewith by a feather key 19. The bearing sleeve 18 is rigidly secured to the shaft 5 by set screws 20 located outward of the driven members 16 and 17. To impart reverse axial sliding movement to the driven members 16 and 17 on the sleeve 18, for clamping the same onto the friction faces 13 or releasing the same therefrom, there is provided, as shown, a pair of diametrically opposite bell cranks 21 pivoted at the junction of their arms to the heads of a pair of eye-bolts 22 that extend parallel to the axis of the shaft 5.

The eye-bolts 22 are mounted in bores in the hub of the inner or driven member 17, with freedom for endwise sliding movement, and have screw-threaded engagement with the hub of the outer or driven member 16. The radial arms of the bell cranks 21 are mounted between pairs of lugs 23 on the outer face of the driven member 17 and pivoted on pins 24 secured in said lugs. On the free ends of the other arms of the bell cranks 21, are inturned cam fingers 25. These connections between the bell cranks 21 and driven members 16 and 17 impart movements to the driven members 16 and 17 in reverse directions, and thereby cause the same to move against the friction faces 13 or out of engagement therewith.

To operate the bell cranks 21 and thereby set or release the clutch, there is mounted on the shaft 5 a shipper collar 26 having a hub 27 with an annular cam 28 and coöperating annular groove 29, said collar also having an annular cam flange 30. The cam 28 and cam flange 30 are axially spaced, the one from the other, with the cam fingers 25 of the bell cranks 21 projecting loosely therebetween, when the clutch is released. To set the clutch, the shipper collar 26 is moved outward to draw the cam 28 between the cam fingers 25 to lift the same, and thereby rock the bell cranks 21 and clamp the driven members 16 and 17 onto the friction faces 13 of the driving member 12. As the cam fingers 25 pass over the highest point or edge of the cam 28, they enter the groove 29 and thereby hold the clutch set. To stop the shipper collar 26 with the cam fingers 25 in the groove 29, and thereby prevent the shipper collar from being moved too far, there is secured to the shaft 5 a collar 31 held in position by a set screw 31'.

A reverse or inward movement of the shipper collar 26 will move first the groove 29 and then the cam 28 out of engagement with the cam fingers 25 and carry the cam flange 30 into engagement with said cam fingers to draw the same inward, and thereby rock the bell cranks 21 to separate the driven members 16 and 17. To cause both of the driven members 16 and 17 to positively move out of engagement with both of the friction faces 13, there is provided an adjustable abutment 32 arranged to be engaged by the driven member 16, when in its extreme released position. With the driven member 16 held in its extreme released position, against the abutment 32, the same becomes a base of resistance for the eye-bolts 22 on which the bell cranks 21 pivotally move to draw the driven member 17 out of engagement with the adjacent friction face 13 and into its extreme released position. This adjustable abutment, as shown, is in the form of a set screw mounted in a lug 33, for adjustment toward and from the driven member 16 and against the inner end of which said member impinges, when in its extreme released position.

Any suitable shipper lever, not shown, may be provided for operating the shipper collar 26. It is, of course, understood that in place of the pulley 9, a gear, sprocket or rope sheave may be substituted therefor, or the spider may be keyed directly to a shaft in axial alinement with the shaft 5 and the clutch used for connecting and disconnecting the two shafts. The friction faces may be replaced, when worn out, with new ones, with comparatively little work, and, by adjusting the abutment 32, the clutch members 16 and 17 may be caused to open with a uniform space or clearance between the friction faces 13.

Figure 3:
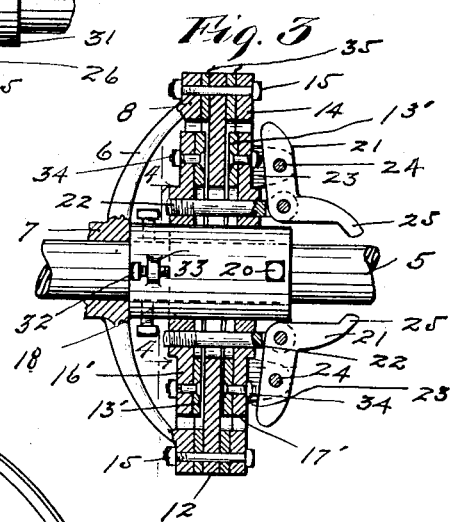
Fig. 3 is a view corresponding to Fig. 1, with the exception that the clutch is arranged to transmit power from the shaft to which it is applied.
Figure 4:
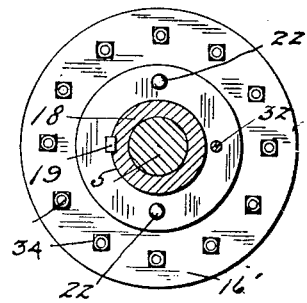
Fig. 4 is a view principally in end elevation and partly in transverse section taken on the line 4—4 of Fig. 3.

Referring now to the construction shown in Figs. 3 and 4, wherein the shaft 5 is treated as the driving member, the construction is the same as that shown in Figs. 1 and 2, with the exception that the friction faces 13' are secured by bolts 34 to the driving members 16' and 17' of the clutch. In this construction, the friction faces 13' do not extend beyond the peripheries of the driving members 16' and 17' and spacing rings 35 are interposed between the driven member 12' and the rings 8 and 14. It may be here stated that the purpose of the two constructions, shown in the drawings, is that it is always deemed desirable to attach the friction faces on the driving member for coöperation with the driven member.

From the above description, it is evident that the above described friction clutch is very simple in construction and of comparatively small cost to manufacture. Said clutch is also of very compact form and confined close to the shaft to which it is applied, or, in other words, its own axis.

What I claim is:—

1. In a friction clutch, the combination with a shaft, of inner and outer clutch members and an intermediate clutch member, said inner and outer clutch members being secured for rotation with the shaft, but with freedom for axial movement with respect thereto, a bell crank pivotally connected to the outer clutch member and having one of its arms pivoted to the inner clutch member for clamping said two members onto the intermediate clutch member and releasing the same therefrom, the other arm of said bell crank having a cam finger, and shiftable cams arranged to alternately engage said cam finger for operating the bell crank.

2. In a friction clutch, the combination with a shaft, of inner and outer clutch members and an intermediate clutch member, said inner and outer clutch members being secured for rotation with the shaft, but with freedom for axial movement with respect thereto, a bell crank pivotally connected to the outer clutch member and having one of its arms pivoted to the inner clutch member for clamping said two members onto the intermediate clutch member and releasing the same therefrom, the other arm of said bell crank having a cam finger, and a shipper collar having axially spaced cams arranged for alternate engagement with the cam finger for operating the bell crank, said shipper collar having a seat for the cam finger to hold the bell crank with the inner and outer clutch members clamped onto the inner clutch member.

3. In a friction clutch, the combination with a shaft, of inner and outer clutch members and an intermediate clutch member, said inner and outer clutch members being secured for rotation with the shaft, but with freedom for axial movement with respect thereto, a bell crank, a bolt having screw-threaded engagement with the outer clutch member and loosely extended through the inner clutch member and having the bell crank pivoted thereto, one of the arms of the bell crank being pivoted to the inner clutch member and the other of said arms being provided with a cam finger, and shiftable cams arranged for alternate engagement with the cam finger for operating the bell crank.

In testimony whereof I affix my signature in presence of two witnesses.

EMIL A. BEYL.

Witnesses:
 CLARA DEMAREST,
 HARRY D. KILGORE.